United States Patent
Hamilton et al.

(10) Patent No.: US 10,294,028 B2
(45) Date of Patent: May 21, 2019

(54) WAREHOUSE AUTOMATION SYSTEMS AND METHODS

(71) Applicant: 6 River Systems, Inc., Waltham, MA (US)

(72) Inventors: Rylan Hamilton, Boston, MA (US); Jerome Dubois, Waltham, MA (US); Christopher Cacioppo, Somerville, MA (US); Timothy Higgins, Rockport, MA (US)

(73) Assignee: 6 River Systems, Inc., Waltham, MA (US)

( * ) Notice: Subject to any disclaimer, the term of this patent is extended or adjusted under 35 U.S.C. 154(b) by 0 days.

(21) Appl. No.: 16/190,570

(22) Filed: Nov. 14, 2018

(65) Prior Publication Data

US 2019/0077601 A1    Mar. 14, 2019

Related U.S. Application Data

(63) Continuation of application No. 16/034,125, filed on Jul. 12, 2018, which is a continuation of application
(Continued)

(51) Int. Cl.
*G06F 7/00* (2006.01)
*B65G 1/137* (2006.01)
(Continued)

(52) U.S. Cl.
CPC ......... *B65G 1/1373* (2013.01); *B65G 1/0492* (2013.01); *B65G 1/1375* (2013.01); *G06Q 10/0875* (2013.01)

(58) Field of Classification Search
None
See application file for complete search history.

(56) References Cited

U.S. PATENT DOCUMENTS

| | | |
|---|---|---|
| 3,312,300 A | 4/1967 | Jones |
| 3,746,189 A | 7/1973 | Burch et al. |
| | (Continued) | |

FOREIGN PATENT DOCUMENTS

| | | |
|---|---|---|
| DE | 202005013177 U1 | 12/2005 |
| EP | 2525316 A2 | 11/2012 |
| | (Continued) | |

OTHER PUBLICATIONS

International Search Report and Written Opinion for PCT/US2016/065329, dated Feb. 15, 2017, 9 pages.
(Continued)

*Primary Examiner* — Yolanda R Cumbess
(74) *Attorney, Agent, or Firm* — Goodwin Procter LLP

(57) ABSTRACT

A warehouse automation system adapted to improve warehouse operating productivity includes a plurality of carts for transporting products within a warehouse and a controller. The controller is adapted to associate a first one of the plurality of carts with a first person and to control the first cart to lead the first person around the warehouse. According to one advantage, the time the first person spends restocking, picking, counting, sorting, moving, and packing product into customer orders and shipments, for example, is reduced.

30 Claims, 9 Drawing Sheets

Related U.S. Application Data

No. 15/812,287, filed on Nov. 14, 2017, now Pat. No. 10,053,289, which is a continuation of application No. 15/371,590, filed on Dec. 7, 2016, now Pat. No. 9,834,380.

(60) Provisional application No. 62/263,966, filed on Dec. 7, 2015.

(51) Int. Cl.
  *G06Q 10/08* (2012.01)
  *B65G 1/04* (2006.01)

(56) References Cited

U.S. PATENT DOCUMENTS

| | | | |
|---|---|---|---|
| 4,088,237 A | 5/1978 | Brown | |
| 4,861,553 A | 8/1989 | Mawhirt et al. | |
| 5,023,790 A | 6/1991 | Luke, Jr. | |
| 5,163,001 A | 11/1992 | Luke, Jr. | |
| 5,250,789 A | 10/1993 | Johnsen | |
| 5,340,262 A | 8/1994 | Tsujimoto et al. | |
| 5,568,393 A | 10/1996 | Ando et al. | |
| 5,657,828 A | 8/1997 | Nagamachi | |
| 5,860,485 A | 1/1999 | Ebbenga | |
| 5,953,234 A | 9/1999 | Singer et al. | |
| 6,206,170 B1 | 3/2001 | Kissel et al. | |
| 6,652,213 B1 | 11/2003 | Mitchell et al. | |
| 6,775,588 B1 | 8/2004 | Peck | |
| 7,073,634 B2 | 7/2006 | Mitchell et al. | |
| 7,569,187 B2 | 8/2009 | Schabbach et al. | |
| 7,603,291 B2 | 10/2009 | Raiyani et al. | |
| 7,639,142 B2 | 12/2009 | Roeder et al. | |
| 7,648,068 B2 | 1/2010 | Silverbrook et al. | |
| 7,774,243 B1 | 8/2010 | Antony et al. | |
| 7,861,844 B2 | 1/2011 | Hayduchok et al. | |
| 7,865,398 B2 | 1/2011 | Schon | |
| 7,945,455 B2 | 5/2011 | Zimmermann | |
| 8,234,006 B1 | 7/2012 | Sachar et al. | |
| 8,406,993 B2 | 3/2013 | Hannah et al. | |
| 8,639,543 B2 | 1/2014 | Boss et al. | |
| 8,674,845 B2 | 3/2014 | Carter et al. | |
| 8,700,230 B1 | 4/2014 | Hannah et al. | |
| 8,725,362 B2 | 5/2014 | Elston et al. | |
| 8,798,784 B1 | 8/2014 | Clark et al. | |
| 8,839,132 B2 | 9/2014 | Reichert | |
| 8,892,241 B2 | 11/2014 | Weiss | |
| 9,091,551 B2 | 7/2015 | Hannah et al. | |
| 9,463,927 B1* | 10/2016 | Theobald | B65G 1/1373 |
| 2004/0143378 A1 | 7/2004 | Vogelsang | |
| 2005/0149226 A1 | 7/2005 | Stevens et al. | |
| 2006/0163350 A1 | 7/2006 | Melton et al. | |
| 2007/0013157 A1 | 1/2007 | Wiff et al. | |
| 2008/0210268 A1 | 9/2008 | Metheny et al. | |
| 2009/0012760 A1 | 1/2009 | Schunemann | |
| 2010/0111767 A1 | 5/2010 | Yonekura et al. | |
| 2011/0000731 A1 | 1/2011 | Boeckler | |
| 2011/0035247 A1 | 2/2011 | Perry et al. | |
| 2011/0266078 A1 | 11/2011 | Hupke | |
| 2011/0320322 A1 | 12/2011 | Roslak et al. | |
| 2013/0096735 A1 | 4/2013 | Byford et al. | |
| 2013/0211977 A1* | 8/2013 | Lyon | G06Q 10/0875 705/29 |
| 2013/0317642 A1 | 11/2013 | Asaria et al. | |
| 2013/0333961 A1 | 12/2013 | O'Donnell | |
| 2014/0074341 A1 | 3/2014 | Weiss | |
| 2014/0107833 A1 | 4/2014 | Segawa et al. | |
| 2014/0257553 A1* | 9/2014 | Shakes | G06Q 10/08 700/216 |
| 2015/0081088 A1 | 3/2015 | Lyon et al. | |
| 2015/0223891 A1* | 8/2015 | Miller | A61B 5/1171 726/19 |
| 2015/0225008 A1 | 8/2015 | Pinchas | |
| 2015/0239667 A1 | 8/2015 | Naylor | |
| 2015/0294260 A1 | 10/2015 | Napoli | |
| 2016/0014252 A1* | 1/2016 | Biderman | B60L 15/20 455/420 |
| 2016/0259341 A1* | 9/2016 | High | E01H 5/12 |

FOREIGN PATENT DOCUMENTS

| | | |
|---|---|---|
| EP | 2633751 A1 | 9/2013 |
| EP | 2915715 A1 | 9/2015 |
| GB | 2416612 A | 2/2006 |
| JP | 2010/064823 A | 3/2010 |
| WO | WO-1998/042239 A2 | 10/1998 |
| WO | WO-2003/054584 A1 | 7/2003 |
| WO | WO-2012/145068 A1 | 10/2012 |
| WO | WO-2015/020974 A2 | 2/2015 |
| WO | WO-2015/112035 A1 | 7/2015 |

OTHER PUBLICATIONS

Matthews Automation Solutions, "Mobile Picking Carts That Support Simultaneous Wave, Batch Picking of Multiple Orders at ProMat 2015", Home (https://lightningpick.com) / Mobile Picking Carts That Support Simultaneous Wave, Batch Picking of Multiple Orders at ProMat 2015, Mar. 20, 2015, (4 pages).

Walters, "Whole Foods developing Kinect-driven shopping cart", Geek.com, Feb. 29, 2012 (3 Pages).

* cited by examiner

| Task | Cart Pick (secs.) | % Reduce | GRS Pick (secs.) | How? |
|---|---|---|---|---|
| Walk to Bin | 15.0 | 40% | 9.0 | Tasks grouped to minimize walking, automate movement of inv. |
| Find Bin | 3.0 | 30% | 2.1 | Image of the location, live stream w/ positive overlay |
| Search for Item | 2.0 | 30% | 1.4 | Image of the item (packaging), description, quantity |
| Grab Item | 3.0 | — | 3.0 | Associate does this better than Arm / Gripper |
| Confirm Pick | 2.0 | 30% | 1.4 | Static image scanner reduces handling, scans item |
| Place Item | 2.0 | 50% | 1.0 | Image of the put tote w/ positive overlay |
| Next Task | 3.0 | 30% | 2.1 | Walk path / map, task info provided by WMS shown on tablet |
| Total | 30.0 (120 uph) | 10 secs. | 20.0 (180 uph) | |

FIG. 8

WAREHOUSE AUTOMATION SYSTEMS AND METHODS

CROSS-REFERENCE TO RELATED APPLICATION

This application is a continuation of and claims priority to and the benefit of all of U.S. patent application Ser. No. 16/034,125, filed Jul. 12, 2018, which is a continuation of U.S. patent application Ser. No. 15/812,287, filed Nov. 14, 2017, which is a continuation of U.S. patent application Ser. No. 15/371,590, filed Dec. 7, 2016, which claims priority to and the benefit of U.S. Provisional Patent Application No. 62/263,966, filed Dec. 7, 2015, the entire disclosures of all of which are hereby incorporated herein by reference.

TECHNICAL FIELD OF THE INVENTION

In various embodiments, the present invention relates to warehouse automation systems and methods. In particular, the systems and methods improve warehouse operating productivity.

BACKGROUND

In general, warehouses are built to temporarily house products and to provide access to those products for fulfilling future orders. Manual labor is typically required to receive, store, count, pick, and ship the products for orders. Managing the capacity of the warehouse, the variability of products, the availability of labor, and the expectations of customers, while minimizing the costs of operations and transportation, can be a challenge for warehouse operators. Many warehouses employ some form of automation to reduce the dependency on labor in the warehouse. These automation systems are generally limited by the availability of open space, the time it takes to install the system, the size and weight of the products the system can support, and the cost to purchase and install the system. The installation of these systems may also further constrain the warehouse operator and limit the ability to meet changes in products, customer expectations, and costs. In addition, access to additional manual labor as business grows can be a significant problem, particularly for operators supporting industries that are highly seasonal.

Accordingly, a need exists for systems and methods of improving warehouse operating productivity.

SUMMARY OF THE INVENTION

In various embodiments, the warehouse automation system described herein facilitates the movement of product around a warehouse and reduces the time associates spend restocking, picking, counting, sorting, moving, and packing product into customer orders and shipments. This helps warehouse operators use less labor and move product around the warehouse faster.

In general, in one aspect, embodiments of the invention feature a warehouse automation system adapted to improve warehouse operating productivity. In one embodiment, the warehouse automation system includes a plurality of carts for transporting products within a warehouse and a controller. The controller is adapted to associate a first one of the plurality of carts with a first person and to control the first cart to lead the first person around the warehouse.

Various embodiments of this aspect of the invention include the following features. The controller may also be adapted to move the first cart at a speed equal to a normal pace of the first person, to move the first cart at a speed faster than a normal pace of the first person, to set settings of the first cart personal to the first person, to assign a task to the first person based upon a computed and/or stored ability of the first person, to associate a second one of the plurality of carts with the first person at the same time that the first cart is associated with the first person, to associate the first cart with a second person different from the first person at (optionally) the same time that the first cart is associated with the first person, and/or to set settings of the first cart personal to the second person.

The first cart may include a receptacle for receiving a product and/or a motor for propelling the first cart. The first cart may also include an on-screen interface and/or an off-screen interface for communicating information to the first person. For example, the on-screen interface may be adapted to communicate information concerning a physical location of the first cart within the warehouse, a physical location of certain product within the warehouse, a current task assigned to the first person, time between various tasks, priorities in the warehouse, and/or performance of the first person.

The off-screen interface may include lighting and/or an audio source. The lighting, for example, may be adapted to identify, through illumination, a receptacle on the first cart within which a product is to be placed or from which a product is to be retrieved. The lighting may also be adapted to differ depending upon a task assigned to the first person. As another example, the lighting may be adapted to communicate information concerning a status of the first cart, a health of the first cart, a movement speed of the first cart, and/or a change in direction of the first cart. The audio source may be adapted to, for example, communicate information concerning a status of a task assigned to the first person, a proximity of the first cart to a plurality of persons, and/or a status of the first cart.

The first cart may include a sensor for, at least in part, identifying a distance of the first person from the first cart, determining a position of the first cart within the warehouse, and/or identifying an obstacle in a path of the first cart. The first cart may also include a product code reader.

In one embodiment, the warehouse automation system also includes a workstation for processing the products. The workstation may include a robotic arm and/or may be adapted to remove a product from the first cart. The workstation may be, for example, a sorting station, a packing station, a shipping station, a kitting station, a personalization station, or a gift wrapping station. The warehouse automation system may also include a display for displaying real-time performance metrics of the first and other persons, and/or a plurality of overhead cameras adapted to monitor the plurality of carts, the first person, and material handling equipment, as well as to determine a location of each cart.

In general, in another aspect, embodiments of the invention feature a method for automating and improving operating productivity of a warehouse. In accordance with one embodiment of the method, a first person is associated with a first one of a plurality of carts for transporting products within a warehouse and the first cart is controlled to lead the first person around the warehouse.

In various embodiments of this aspect of the invention, the first cart may be moved at a speed equal to a normal pace of the first person or at a speed faster than a normal pace of the first person. The method may also include associating the first person with a second one of the plurality of carts at the same time that the first person is associated with the first cart, and/or associating a second person different from the first person with the first cart at (optionally) the same time that the first person is associated with the first cart. A task may also be assigned to the first person based upon a computed and/or stored ability of the first person. In another embodiment, a receptacle on the first cart is illuminated to identify the receptacle within which a product is to be placed or from which a product is to be retrieved. Optionally, the receptacle on the first cart is illuminated differently depending upon a task assigned to the first person. In yet another embodiment, the method includes communicating, via an audio source, information concerning a status of a task assigned to the first person, a proximity of the first cart to a plurality of persons, and/or a status of the first cart. The method may also include displaying real-time performance metrics of the first and other persons.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 8 is a table summarizing exemplary advantages of a warehouse system that employs an enhanced cart in accordance with one embodiment of the invention.

DETAILED DESCRIPTION

In broad overview, embodiments of the present invention feature a warehouse automation system adapted to improve warehouse operating productivity. The system includes a plurality of enhanced carts for transporting products within the warehouse and a controller. Use of the enhanced carts improves upon current warehouse systems, as the enhanced carts have several features that improve user or associate productivity. These features can, for example, be customized to each associate and/or give rise to gamification. Further, the enhanced carts may include features to ease the process of adopting this new technology in practice. In various embodiments, these improvements over traditional carts decrease the time the associate spends, for example, restocking, picking, counting, sorting, moving, and packing product into customer orders and shipments.

Figure 1:
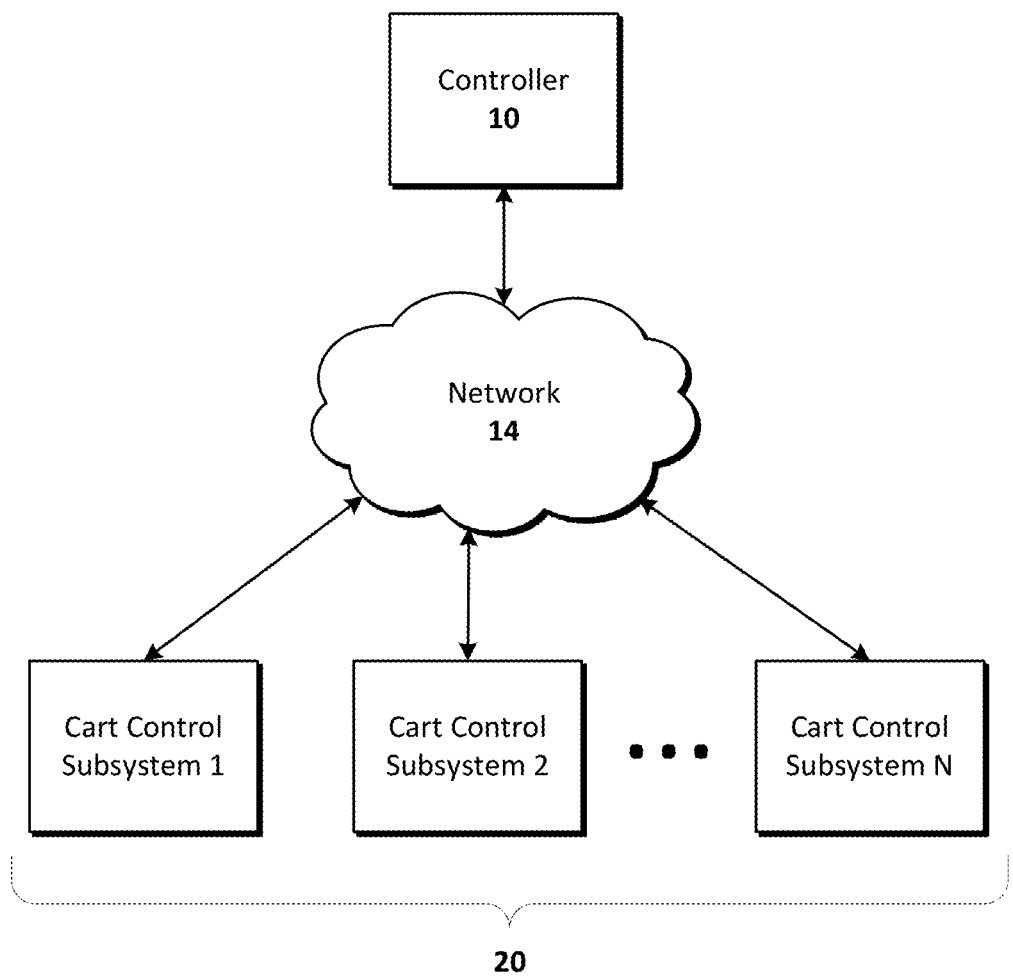
FIG. 1 is a block diagram depicting a high-level system architecture for a warehouse automation system in accordance with one embodiment of the invention.

FIG. 1 depicts an exemplary high-level system architecture for the warehouse automation system. In the depicted implementation, the warehouse automation system includes a controller 10 in communication over a network 14 with one or more control subsystems 20 disposed in respective enhanced carts. The network 14 can provide direct or indirect wireless links among communicating devices using, for example, 802.11 (Wi-Fi), Bluetooth, GSM, CDMA, or other suitable techniques. As referred to throughout this disclosure, the term "system" can include the controller 10, the control subsystems 20 in the enhanced carts, and/or other computing devices or subsystems that communicate or interface with any of the foregoing components to provide the functionality described herein. For example, when it is stated herein that the "system" performs a function or accomplishes a task, it is generally meant that (either individually or collectively) the controller 10, the control subsystems 20 in the enhanced carts, and/or the other computing devices or subsystems perform the function or accomplish the task. One of ordinary skill in the art will appreciate that various configurations of the warehouse automation system are possible.

The controller 10 and the control subsystems 20 can include suitable hardware and software to provide the functionality described herein. For example, the controller 10 and the control subsystems 20 can include appropriate transmitters and receivers (e.g., Wi-Fi network adapters, Bluetooth radios, etc.) to communicate with each other and/or over the network 14. The controller 10 and the control subsystems 20 can also include general purpose computing devices, each in the form of a computer including a processing unit, a system memory, and a system bus that couples various system components including the system memory to the processing unit, and/or embedded devices or other special purpose logic circuitry, e.g., an FPGA (field programmable gate array) or an ASIC (application-specific integrated circuit). Computing devices included in the controller 10 and the control subsystems 20 can utilize software processing modules stored in a memory and executed on a processor. Processors suitable for the execution of a computer program include, by way of example, both general and special purpose microprocessors. Generally, a processor receives instructions and data from a read-only memory or a random access memory or both. Information carriers suitable for embodying computer program instructions and data include all forms of non-volatile memory including, by way of example, semiconductor memory devices, e.g., EPROM, EEPROM, and flash memory devices; magnetic disks, e.g., internal hard disks or removable disks; magneto-optical disks; and CD-ROM and DVD-ROM disks.

By way of illustration, the software modules can be in the form of one or more suitable programming languages, which are converted to machine language or object code to allow the processor or processors to execute the instructions. The software can be in the form of a standalone application, implemented in a suitable programming language or framework. In some implementations, such software executes on a custom or commercially available operating system, such as the Microsoft Windows® operating systems, the Apple OS X® operating systems, the Apple iOS® platform, the Google Android™ platform, the Linux® operating system and other variants of UNIX® operating systems, and the like. Additionally or alternatively, some or all of the functionality described herein can be performed remotely, in the cloud, or via software-as-a-service.

A. Enhanced Carts

Figure 2A:
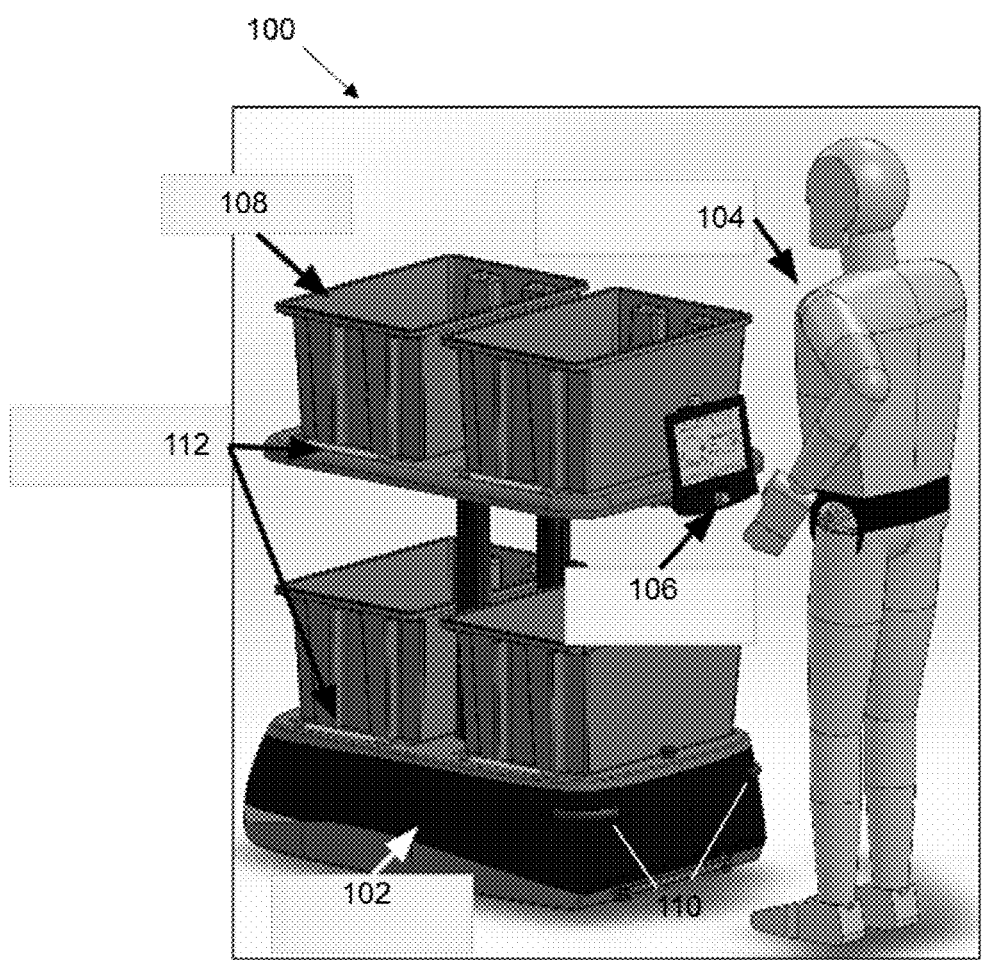
FIG. 2A schematically illustrates an enhanced cart in accordance with one embodiment of the invention.

FIG. 2A depicts an enhanced cart system 100 in accordance with one embodiment of the invention. As illustrated, one or more enhanced carts 102, often referred to in the industry as picking carts, can work alongside one or more warehouse associates 104 to move inventory around a warehouse. The enhanced carts 102 are intended to assist in most warehouse tasks, such as picking, re-stocking, moving, sorting, and counting or verifying products. These carts 102 can display information to the associate 104 through the use of a screen 106 and/or onboard visual and/or audible indicators that improve the performance of the associates 104. The carts 102 need not necessarily be assigned to one specific associate 104. Rather, there can be multiple carts 102 that help an associate 104 throughout the day, optionally at the same time. Likewise, a single cart 102 may work with multiple associates 104 in a single day, optionally at the same time. The system may track the location of each cart 102 and the identity of each associate 104 completing the task at hand. The system may also store relevant transaction information (e.g., product, location, and associates) within the system for further analysis.

B. Enhanced Carts' Carrying Capability

Referring still to FIG. 2A, the enhanced carts 102 may be configured to carry one or many similar or distinct storage receptacles 108, often in the form of totes or boxes, that can be used to hold one or more different products. These storage receptacles 108 may be removable from the enhanced cart 102. In some cases, each receptacle 108 can be used as a separate picking location (i.e., one receptacle 108 is a single order). In other cases, the receptacles 108 can be used for batch picking (i.e., each receptacle 108 can contain multiple complete or partial orders). Each receptacle 108 may be assigned to one or many different stations for post-pick sortation and processing. In one embodiment, one or more of the receptacles 108 are dedicated to batch picking of multiple types of products and another one or more receptacles 108 are dedicated to picking multiple quantities of a single product (e.g., for orders that only have one item). This singleton picking allows the warehouse to skip secondary sortation and deliver products directly to a packaging station. In another embodiment, one or more of the receptacles 108 are assigned to order picking (e.g., for potentially time sensitive orders) and one or more of the receptacles 108 are assigned to batch picking (e.g., for lower cost or less time sensitive orders). In yet another embodiment, one or more of the receptacles 108 carry product that will be used to re-stock product into storage locations. Another option is for the enhanced cart 102 to move product and/or shipments throughout the warehouse as needed between different stations, such as packing and shipping stations. In yet another implementation, one or more of the receptacles 108 is left empty to assist in counting product into and then back out of the receptacle 108 as part of a cycle count task regularly carried out in warehouses for inventory management. The tasks may be completed in a mode dedicated to one task type or interleaved across different task types. For example, an associate 104 may be picking products into receptacle "one" on the enhanced cart 102 and then be told to grab products from receptacle "two" on the enhanced cart 102 and put them away in the same aisle.

C. Off-Screen User Interface

Most systems today rely heavily on a screen for their user interface. The system described herein includes a screen 106 and further features a significant amount of user interface/user experience away from the screen 106. For example, lighting on the enhanced cart 102 may be used to light up the source and/or the destination of any products being placed into or taken out of the cart's storage receptacles 108. FIG. 2A shows lighting places 110 at the rear of the cart 102 similar to car tail lights and also lights 112 below each storage receptacle 108 location. This lighting may change color based upon the task, so that the associate 104 has to look minimally or not at all at the screen 106 for instructions. Any storage receptacle 108 that spans the enhanced cart 102 may have lighting 112 that can illuminate on either side, either for visibility from any side or as an indicator as to which side of the enhanced cart 102 the product should be picked from or placed to. The lighting 112 may be finely divisible into many segments and can be configured to illuminate one or many storage receptacles 108 without physically changing the lights. If there is only one receptacle 108, the entire light indicator 112 may light up. If there are two or more storage units 108, then the lighting indicator 112 may be divided into two or more segments, so that each receptacle 108 can be individually indicated. LED strip lighting or other suitable lighting may be utilized.

In some embodiments, one or more action buttons are present on the cart 102 and allow the associate 104 to confirm actions such as putting an item into a storage location 108, such as a tote or bin, or to pause the cart 102. In some embodiments, these buttons are placed on a continuous, touchable surface near the edges of the storage locations 108 on the enhanced cart 102.

In addition to storage receptacle 108 identification, lighting may be used to indicate cart status or health, speed of movement, intended change in direction, or other information useful for the interaction with associates 104 in completing their tasks.

The visual user interface may be complemented with audio instructions to aid the associate 104. This is often helpful where the associate 104 does not have sight of the screen 106 or is visually impaired, in aiding with communications with a supervisor or a remote help desk to assist the associate 104 through his/her task, or in coordination with video conferencing technologies embedded in a graphical user interface that may be used in interacting with a remote help desk or other assistance. In addition, in some embodiments, the audio source communicates information concerning the status of a task assigned to the associate 104, the proximity of the enhanced cart 102 to one or more associates 104, and/or the status of the enhanced cart 102.

D. On-Screen User Interface

Some of the user interface may be presented on a screen that shows the associate 104 working with the system information to help the associate 104 reduce the time it takes to complete his/her tasks in the warehouse. Such a graphical user interface screen may be located on the mobile cart 102 (as is the case, for example, with the exemplary screen 106 depicted in FIG. 2A) or the graphical user interface screen may be in the associate's possession (e.g., on a mobile computer, such as a tablet or smartphone, or on a wrist mounted screen).

The associate 104 may employ a wireless headset, phone, touchscreen, or other computer (hereinafter referred to as a "mobile device"). In some embodiments, when an associate 104 switches to a new cart 102, the system will automatically switch the mobile device, because the system knows in advance to which cart 102 the associate 104 will be paired. In addition to the fully automated switching, the cart 102 may require that the associate 104 confirm the switch by interacting with the old cart, the new cart, and/or the mobile device. As an example, an associate 104 using a first cart may switch to a second cart and at that time the associate's mobile device disconnects from the first cart and connects to the second cart.

The screen employed by the associate 104 may provide context sensitive information that takes into account some combination of one or more of the following information: the cart's and/or associate's physical location in the warehouse, the current tasks they are working on, time between tasks, priorities in the warehouse, location and storage details, physical location of product in the warehouse, and previous performance information of that associate 104.

Information may be displayed that allows the associate 104 to quickly identify what task(s) he/she is supposed to accomplish and what product(s) he/she is supposed to operate on, as well as the source and the destination of the products for the current task.

By displaying information to the associate 104 (e.g., on the cart's screen 106 or on a mobile device screen) while the cart 102 is moving between tasks, the time to complete the next task may be shortened advantageously, as the associate 104 has less information to process upon arrival at the location of each task. Tasks completed upon arrival may include picking or replenishment of items in the warehouse. In some embodiments, information displayed while moving or transitioning between tasks includes the distance to the next task, the location of the next task, the item to grab, the quantity to grab, and real time information like productivity rates.

In addition to displaying information in advance of one task, the screen 106 on the enhanced cart 102 and/or a mobile device screen may also display information on the next string of tasks. This allows the associate 104 to become aware of all tasks in an area and to optimize his or her movement to complete these tasks without looking at the screen for each step.

Figure 2B:
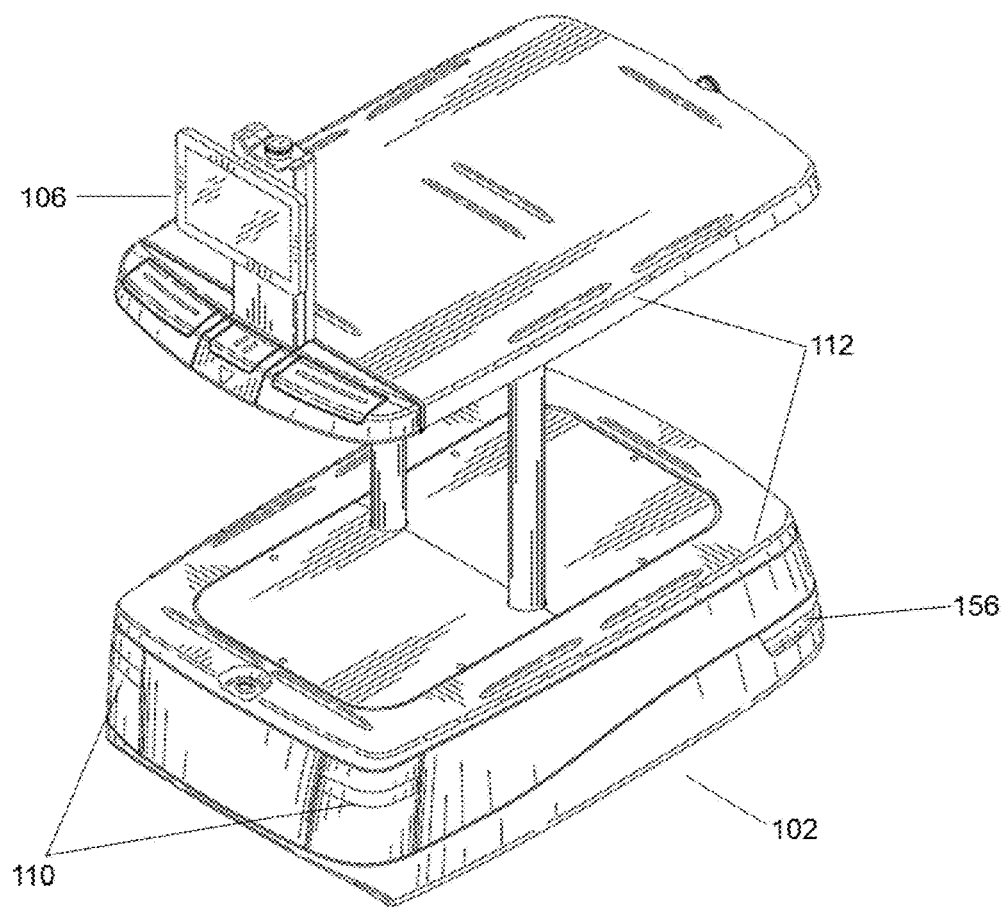
FIG. 2B schematically illustrates an enhanced cart in accordance with another embodiment of the invention.

FIG. 2B is an alternative embodiment of the enhanced cart 102, and is shown (for ease of understanding) without the storage receptacles 108 being present. As before, the enhanced cart 102 includes the screen 106 and lighting indicators 110, 112. In operation, the storage receptacles 108 may be present on the enhanced cart 102 depicted in FIG. 2B. As illustrated, a front end of the cart 102 may define a cutout 156. There may be one or more sensors (e.g., light detecting and ranging sensors) housed within the cutout 156. The cutout 156 permits the sensor(s) to view and detect objects in front of and to the side of (e.g., more than 180° around) the cart 102.

Figure 3:
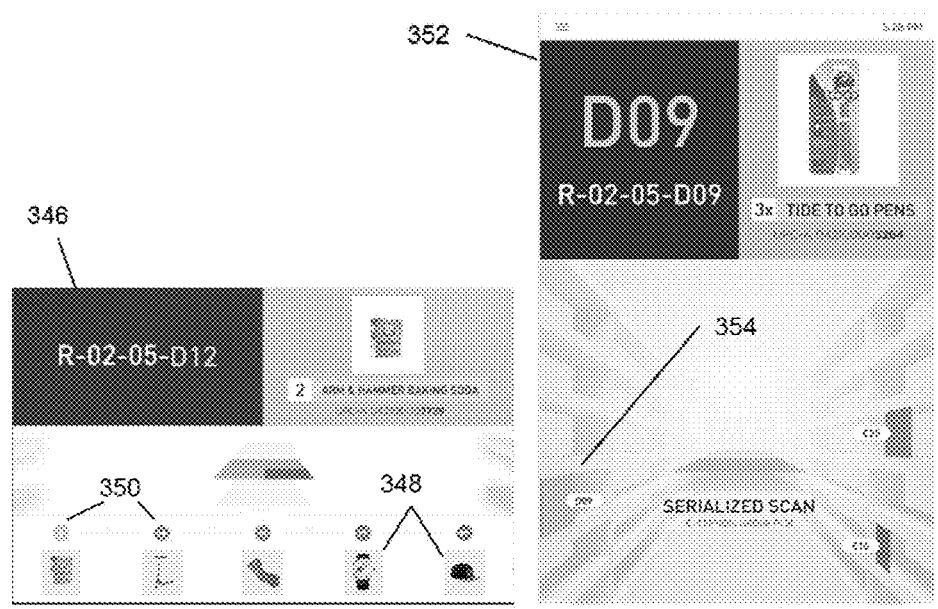
FIG. 3 is an exemplary graphical user interface in accordance with one embodiment of the invention.

FIG. 3 shows an exemplary graphical user interface that may be displayed on the screen 106 of the enhanced cart 102 or on a mobile device screen. A first display 346 shows the items to pick 348 and the direction of those items 350. A second display 352 shows the bins 354 from which each item 348 needs to be picked. The display 352 may also contain additional information, such as the locations of bins of the following items to be picked and the number of each item to be picked.

E. Associate Motivational Enhancement

The associates 104 working at a warehouse often have physically difficult and mentally tedious work. In various embodiments, the system described herein gets the best productivity out of each associate 104 and motivates them in a number of ways. One way is by keeping the associates 104 mentally engaged and focused on their work—this reduces error rates and increases productivity. Using gamification methods to create a competitive environment can achieve many of these goals. By keeping real-time score, daily/weekly/monthly high scores, or performance trends, associates 104 compete against one another and/or themselves. In some warehouse operations, a portion of the associate's compensation is tied to his/her individual performance, based upon hitting or exceeding certain rates or other performance metrics. In the most widely used systems, associates 104 only learn how well they are performing at the end of their shift or the end of the week. In embodiments of the system described herein, the associates' performances are shown in real time (e.g., via the screen 106 or via another display, such as an overhead display) so that they remain informed and motivated to hit various individual and team goals.

Figure 4:
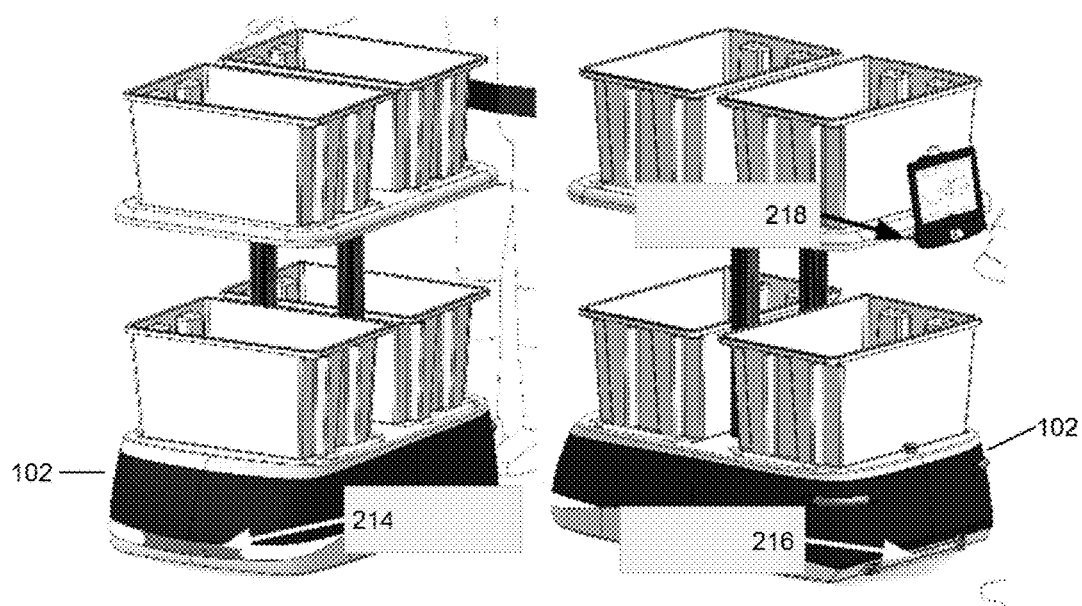
FIG. 4 schematically illustrates two enhanced carts in accordance with yet another embodiment of the invention and, in particular, depicts exemplary sensors on the enhanced carts.

In one embodiment, the system also captures the rate that the associates 104 move through the warehouse. The system has the ability to learn the basic pace of an associate 104 and to use that data to establish each associate's "normal pace." The system may move the cart 102 through the warehouse at the associate's "normal pace" or, to improve productivity rates, the system may prompt the cart 102 to move slightly faster than the "normal pace" for the associate, essentially "pulling" him/her through his/her work from the front. For example, the cart 102 may move 5%, 10%, 15%, or 20% faster or more. With reference to FIG. 4, there may also be a sensor 216 at the rear of the cart 102 to identify the distance of the associate 104 from the cart 102, allowing the cart 102 to stop or slow down if the pace is too fast and the associate 104 is not keeping up.

In greater detail, the system may adapt the enhanced cart 102 to the pace that optimizes the rate of the associate 104 based on learned parameters. In some instances, the enhanced cart 102 will move faster or slower depending on which associate 104 is paired to the cart 102. In addition, the enhanced cart 102 might not stop for a task, such as picking, but instead may just slow down enough to allow the associate 104 to complete the task.

In one embodiment, the system knows when the enhanced carts 102 are working with a particular associate 104. As such, the associate's interaction with the cart 102 and the system can be personalized to make the associate 104 more efficient and more content. In various embodiments, this includes changing the language, voice (e.g., male or female, accent, etc.), or other features based on various associate needs or disabilities, such as color blindness, as the cart 102 hands off between various associates 104 or as the associate 104 transitions between carts.

F. Enhanced Cart Sensors

With reference still to FIG. 4, in one embodiment the enhanced cart 102 has a number of sensors 214, 216 that it uses to navigate around the warehouse and interact with associates 104 and product within it. For example, the enhanced cart 102 may have a sensor 214 located at a front of the cart 102 and/or a sensor 216 located at the rear of the cart 102. Sensors, such as laser ranging, structured light sensors or just cameras, may be used to locate the enhanced cart 102 within the warehouse and detect possible obstacles in the cart's way. Techniques, such as Simultaneous Localization and Mapping (SLAM), can be used to create or enhance digital maps of the warehouse and to locate the carts 102 within the warehouse. This information may be shared between multiple enhanced carts 102 in the warehouse, so that they continually or periodically receive updated information about changes in the warehouse.

The enhanced cart 102 may also use these sensors 214, 216 to localize itself by, for example, detecting visual images including words, numbers, and/or any two dimensional or three dimensional codes used in a warehouse. Once a labeling code has been identified, its location in the warehouse may be looked up and used to augment other location information for the enhanced cart 102. This information can also be used in reverse. For example, once an enhanced cart 102 knows its location, it can use the location information to map key points of interest in a warehouse, such as bins, travel paths, charging locations, and meeting points.

Additional sensors, such as laser ranging sensors, thermal imaging sensors, structured light sensors, or video, may be used to detect the location of the associates 104 that the system is assisting. This allows the system to slow down the cart 102 or send an alert or notification to the associate 104 or management if the associate 104 falls too far behind or leaves the proximity of the enhanced cart 102.

The enhanced cart 102 may also have one or more product code readers 218. These may be used to read a one dimensional code, such as UPC barcodes, a two dimensional code, such as QR codes, or both. The cart 102 may use the product code reader 218 to verify the product code during picks, re-stocking, and counting. Furthermore, the enhanced cart 102 may read barcodes of products or storage locations as it moves past them, unrelated to the active workflow. This may be used to help identify the cart's location in the warehouse, verify the location of products in the warehouse, or complete cycle counting tasks of products or empty product locations. Further, the system may monitor product locations and can sense if they have been modified, triggering a manual verification if the modification was unexpected. This can be helpful in correcting for mispicked items or possible theft.

In some embodiments, the enhanced cart 102 has a weight sensor under each storage receptacle 108 to measure the change of weight when an item of a known or unknown weight is put onto the cart 102. This weight sensor may detect the difference and confirm that the item was placed in the correct location. If the weight sensor does not detect a change in weight or does not detect the correct change in weight, it may flag that an item was not placed in the correct storage receptacle 108 on the cart 102 or that an incorrect item was placed in the storage receptacle 108 on the cart 102.

In some embodiments, the enhanced cart 102 has a camera or image sensor looking at certain locations on the enhanced cart 102 and/or into the storage receptacles 108 positioned on the cart 102. This sensor can confirm if an item has been placed into or taken from the storage receptacle 108 on the cart 102. In one embodiment, the system looks for a change in the location image before and after an expected action. As another example, object recognition may be used to detect if an item has been placed into or has been taken out of a storage receptacle 108. Object recognition may allow for a higher level of accuracy.

Some embodiments of the enhanced cart 102 include a weight sensor, a camera or image sensor, a hall effect sensor (e.g., using magnets), or some sort of electrically transmitting or passive response tag to detect the placement and removal of storage receptacles 108 on the enhanced cart 102.

G. Enhanced Cart Collaboration with Associates

The enhanced carts 102, especially if they are self-powered, may create initial hesitation for associates 104 in a warehouse, regardless of how safe they are. This can be distracting to the associates 104 or cause them to interact cautiously with the cart 102, not knowing how or when the cart 102 moves. This hesitation may have a negative impact on productivity. To address this concern, the cart's movements may be made more obvious by giving visual feedback to the associates 104 when the carts 102 are starting to move, stopping, and/or turning. In addition, to reduce any learning curve, the carts mimic, in one embodiment, something that most people are familiar with: the automobile. In one such embodiment, the enhanced cart 102 is configured to look and act as much as possible as a conventional car. This includes blinkers, brake lights, and other visual and audible cues that make the associates 104 comfortable that they understand what to expect from the enhanced cart 102.

H. System Adapts to Associates

Different associates 104 have different skill levels, speeds, heights, and other characteristics that effect which tasks they perform best, as well as how to best get them to perform those tasks. Their skills may also evolve as they learn and have more experience at one or more tasks or other operations. In one embodiment, the system described herein learns, through machine learning techniques such as neural networks, support vector machines, and others, the workflow between various associates 104 and optimizes which associates 104 are assigned to which tasks. For instance, the system can learn characteristics such as the time it takes to access product that is on different level shelves (e.g., due to an associate's height), or how product weight affects an associate's picking rate (e.g., due to the associate's strength), and then assigns tasks to associates 104 who are best able and quickest at performing these tasks. As previously discussed, the system may also learn an individual associate's walking speed to set the speed of the enhanced cart 102. Another issue addressed by the system is understanding the real cost of interleaving (i.e., mixing multiple task types like picking and re-stocking), so as to create the right mix of tasks to optimize associate performance.

I. Product Flow

Figure 5:
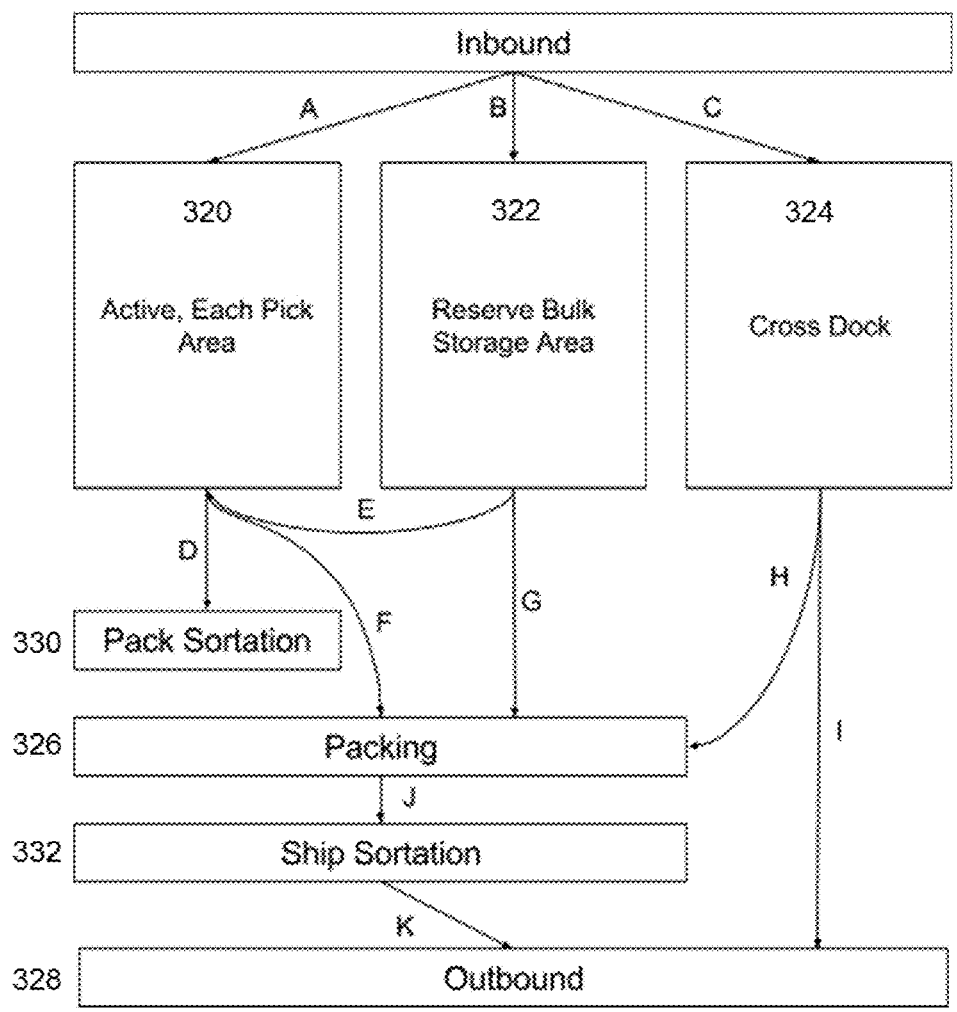
FIG. 5 is a block diagram illustrating product flow within a warehouse in accordance with one embodiment of the invention.

FIG. 5 is a block diagram depicting the flow of product through a warehouse that ships customer orders, in accordance with one embodiment of the invention. In various embodiments of the system depicted in FIG. 5, enhanced carts 102 collaborate with warehouse associates 104 to help the associates 104 in their tasks and to move product between different areas of the warehouse. These enhanced carts 102 may be propelled by motors to transport product around the warehouse and reduce the amount of time people would otherwise spend manually moving product in a non-automated warehouse.

I.1. Inbound Product

In the exemplary system depicted in FIG. 5, there are three options for where inbound product can be directed (i.e., paths A, B, and C). In various embodiments, the enhanced carts 102 direct and transport the product from inbound to each of these areas where the product is stored. The "Active, Each Pick Area" 320 stores product that is ready to be picked for customer orders. The "Reserve Bulk Storage Area" 322 holds product that may be too large to fit in the active area 320 or that is reserve quantities for product stored in the "Active, Each Pick Area" 320. Product that goes through the "Cross Dock" area 324 is not stored in the warehouse and is in transit to its final destination. This product may be either merged with other product in the "Packing" area 326 via path H or sent directly to the outbound area 328 via path I.

I.2. Outbound Product

When a customer order is assigned to the warehouse, the system may determine the optimal resource to pick the item—whether it be an associate 104 with an enhanced cart 102, an associate 104 with no cart, a forklift, or other material handling vehicle or apparatus. The product might be stored in the "Active. Each Pick Area" 320 or in the "Reserve Bulk, Storage Area" 322. If the product is in the "Active, Each Pick Area" 320, the product may be picked and transported to either "Pack Sortation" 330 (via path D) or "Packing" area 326 (via path F). "Pack Sortation" 330 is the area where product is merged into discrete customer orders. If this sortation does not need to happen, product may be moved directly to "Packing" area 326. If the product is in the "Reserve Bulk Storage Area" 322, it may be moved into the "Active. Each Pick Area" 320 via path E or sent to the "Packing" area 326 via path G. Once items are sorted into discrete orders (via process J), they may need additional sortation by transportation carrier, destination zone, or delivery method. "Ship Sortation" 332 may occur (via process K), after which the orders are loaded in the outbound area 328 onto trucks or other vehicles for shipment to customers.

The system can support any number of permutations depicted in FIG. 5 and can be configured based on the unique needs of the warehouse. For example, using software and hardware (e.g., a controller 10, as described above, which may be part of the overall system described herein), the enhanced carts 102 can be configured to transport one or many storage receptacles 108, such as a totes or customer shipments, through different simultaneous processes, such as batch pick (i.e., groups of products) and discrete order pick (i.e., groups of complete orders).

As explained above, some enhanced carts 102 are autonomous and lead associates 104 around the warehouse. In various embodiments, the enhanced carts 102 supplement associate workflow with on and off screen interfaces to make the associate 104 more productive by reducing the time to complete an assigned task and reducing the downtime between tasks. These interfaces can also motivate the associate 104 to work faster by displaying real-time and historical performance data and/or by gamifying the workflows to make the associate's job more interesting. In some embodiments, the system uses historical data to adapt to each associate 104.

The system moves product to different workstations for processing—including packing, shipping, kitting, personalization, gift wrap, and other stations. After processing, products may be combined into orders for shipment. The system can be used to sort shipments by ground or air delivery as determined by customer need or paid level of service. Depending on the shape and characteristics of the product, the system may also interface with downstream sortation automation to further reduce the amount of labor needed to process an order.

J. Post-Pick Sortation

Figure 6:
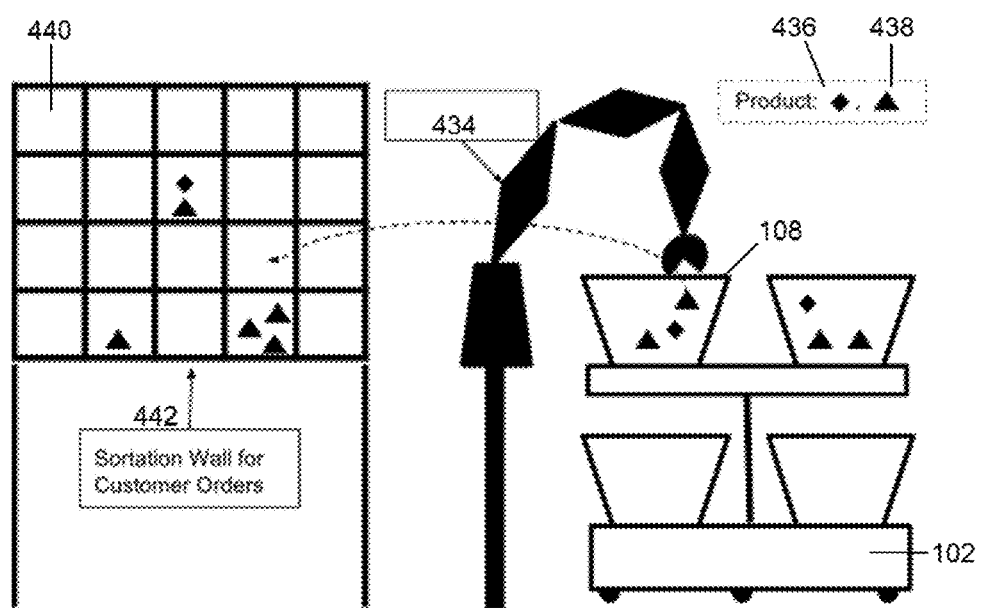
FIG. 6 schematically illustrates a post pick sortation station in accordance with one embodiment of the invention.

FIG. 6 schematically illustrates a post pick sortation station in accordance with one embodiment of the invention. After a warehouse associate 104 picks into the enhanced cart 102, the cart 102 may be sent to multiple stations for post pick sortation. At some stations, the sortation is done by associates 104. At other stations, a robotic arm 434 picks product items 436, 438 from a storage area 108 on the enhanced cart 102 and places them into specific bins 440 (e.g., on a sortation wall 442) assigned to unique customer orders. In FIG. 6, the diamonds 436 and triangles 438 represent different product being moved by the robotic arm 434 into the sortation wall 442. After the final item for the customer order is placed into the wall 442, an associate 104 is notified and the order is packed out for shipment. This allows the "Pack Sortation" process 330 depicted in FIG. 5 to be automated. In some embodiments, the enhanced cart 102 makes multiple stops at different stations of this type, or multiple enhanced carts 102 stop at these stations to complete customer orders or shipments.

K. Multiple Enhanced Cart Coordination

In various embodiments, there are multiple enhanced carts 102 working in the same warehouse and there is a benefit to having the system coordinate the carts 102 to work better than they would by themselves. Navigation information, such as detected changes in the warehouse layout, information on obstacles, and location of associates 104 and carts 102 or other tracked equipment, can be shared between the enhanced carts 102, allowing them to make better navigation choices. In one embodiment, the enhanced carts 102 are given strong suggestions or rules that allow them to navigate congested warehouse floor locations or aisles more effectively. This may be done by assigning directionality to various aisles and open areas so that the computation required to navigate congested areas is simplified.

In one embodiment, the external controller 10 also helps coordinate the multiple enhanced carts 102 that are interacting with one or more associates 104. Cart position planning may be used to help the associate 104 stay busy. For example, when one cart 102 is full, or otherwise finished with its work, a second cart 102 is immediately available for the associate 104. This minimizes transition time between carts 102, keeping associate utilization high. The associate 104 may also work with multiple carts 102 simultaneously, for example on opposite sides of the aisle, to increase the amount of work completed. The system may also tell the associate 104 to meet an enhanced cart 102 at a predetermined and/or designated location.

The system controller 10 can also interact with other material handling equipment, such as forklifts, which can be tracked and which may be autonomous or semi-autonomous. This mobile equipment may be coordinated by the system so that it is more efficiently routed and scheduled with the enhanced carts 102. If it is not possible or feasible to assign tasks to some or all of the other equipment, their position in the warehouse may be used to help route the enhanced carts 102 so as to limit or prevent congestion or possible collisions.

In one embodiment, the system works with automatic picking and placing systems. The system may also ensure that the appropriate resource is used to complete the task most efficiently. For example, if a robotic arm and the enhanced cart 102 reduces the cost (e.g., time, accuracy, etc.) of the pick, the combination is assigned to complete the task.

L. Assigning Different Enhanced Carts Based on Workload

In one embodiment, the system supports carts 102 having different configurations, such as the size, capacity, and/or location of the receptacles 108. For example, the system may maintain the different configurations of enhanced carts 102 and assign the right configuration to support the task attributes of product, associate, or task type (e.g., count, pick, re-stock, etc.).

M. Enhanced Carts' Mobility

Although not required, the system generally performs better if the enhanced carts 102 move under their own power. This reduces the amount of time walked by the associates 104 and reduces the amount of work the associate 104 would normally have to do when pushing or pulling the cart 102. See the table in FIG. 8, discussed further below. In addition, the cart 102 may guide one or more associates 104 to the correct location for their work and then stop, slow down, or drive (e.g., at crawl speed) by the location of the task, as appropriate.

N. Asset Tracking with Cameras

Figure 7:
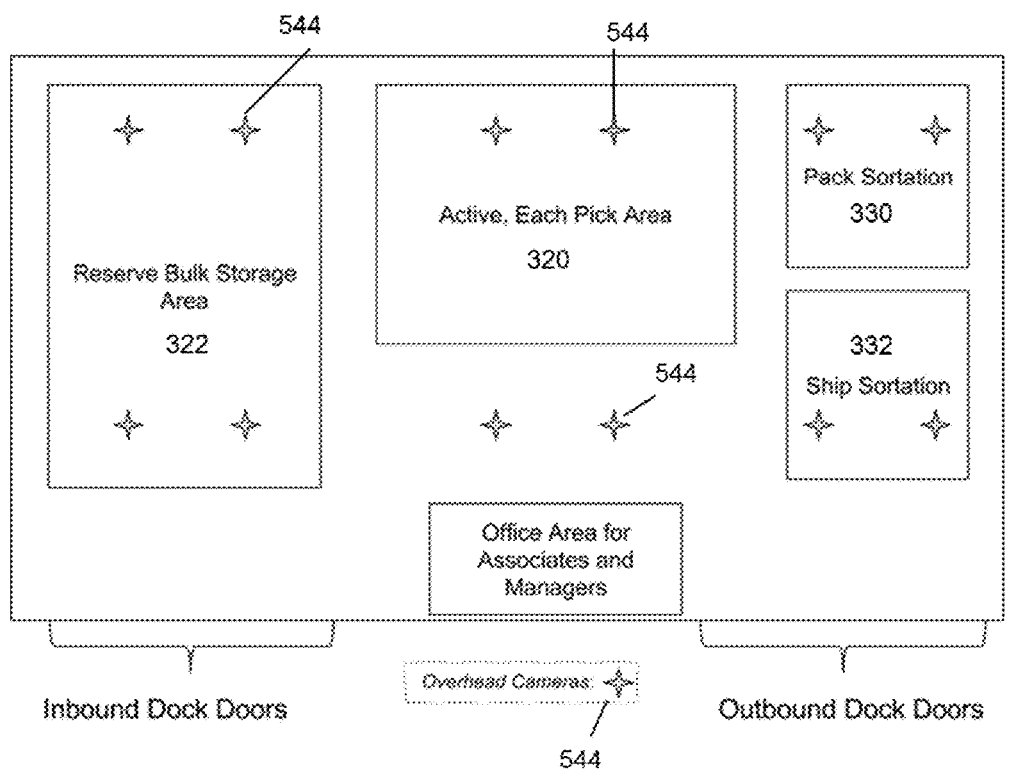
FIG. 7 is a block diagram of a warehouse in accordance with one embodiment of the invention.

In various embodiments, specialized overhead cameras are used to track the carts 102, associates 104, forklifts, and other mobile equipment. These overhead cameras can look for identifying marks placed on tracked objects. FIG. 7 shows a schematic warehouse layout and the location of overhead cameras 544 (depicted as stars 544 in FIG. 7), in accordance with one embodiment of the invention. The identifying marks may be natural shapes of the objects or a special pattern that is either in the visible or invisible spectrum. The specialized cameras 544 can then track the various objects and convert their positions into physical locations. This information may be collected from a series of cameras 544. In some embodiments, these cameras 544 are located near the ceiling. The cameras 544 can collect image data independently from each other and often overlap in their coverage area. Various approaches may be employed to merge multiple cameras' data streams. A first approach is to take each set of image data and merge them together, and to look for patterns in the resulting meta-image. A second method, which is usually computationally superior, is to track each item with a single camera 544 and then combine the location information together in a weighted form to get final location information. Although it is possible to track items with cameras 544 that do not have somewhat overlapping images, the quality of tracking data is generally superior if there is more overlap. In addition, subsampling techniques can be used to get sub-pixel accuracy of a location that is more accurate than the base resolution of the cameras 544.

O. Enhanced Carts Leading

In various embodiments, the system knows the location of enhanced carts 102 within the warehouse and, at times, the enhanced carts 102 lead associates 104 around the shelving aisles and other areas of the warehouse. The enhanced carts 102 move at a speed determined by the system. By leading the associate 104, the enhanced cart 102 can prevent wrong turns and stop in specific locations next to workstations or in storage locations to increase associate 104 productivity. If associates 104 do not keep pace with the cart 102, the system can adapt and store this information for analysis and performance monitoring. In various embodiments, the enhanced cart 102 uses audio and visual indicators to make the enhanced cart 102 easier to follow for the associate 104, so that the associate 104 can anticipate the cart's movement.

P. Exemplary Advantages of the System Described Herein

The pick process may be modeled as seven steps—walk to the bin, find the bin, search for the product, grab the product, confirm the product is correct, place the product into the receptacle 108, and request the next task. In general, the system reduces the time of six of these steps—all except grab the product. In FIG. 8, the proposed time savings is projected for each of the seven steps in the typical batch pick between a manual cart pick and an enhanced cart pick.

Walk to Bin: A typical cart pick operation is calculated to spend 15 seconds per pick walking to the bin. By aggregating picks into batch picks, and keeping the associate 104 in the aisles and not in other areas, like cart 102 turnover, the system can reduce 40% of the walking an associate 104 does.

Find Bin: When the associate 104 is in the location of a bin, he/she has to find the bin in the racking. The system can reduce or eliminate the search time by showing, for example on the screen 106, an image of the location and by highlighting the location in relation to other bins in the area.

The enhanced cart 102 may stop in a position relative to the bin where work is being performed to minimize the associate's time moving goods to and from the enhanced cart 102 and the bin.

Search for Item: The associate 104 can be shown, for example on the screen 106, an image of the product, a description, the position of the scannable barcode (for verification), and the quantity to help find the item in the bin faster.

Grab Item: In various embodiments, this step is not automated or affected, though a robotic arm could be used to grasp a heavy or cumbersome item, in some embodiments.

Confirm Pick: After the product is picked from the bin, a fixed scanner 218 on the enhanced cart 102 can scan the barcode to verify that the item is correct. This process can be faster than a traditional operation, where the associate 104 has to hold a scanner in one hand and the product in the other hand, find the bar code on the product, and trigger the scan to take place.

Place Item: The next step is for the associate 104 to place the item into the correct storage receptacle 108 on the cart 102. Using lights 112 and other interfaces and on-screen 106 images, the process can be sped up over a traditional operation, where the associate 104 has to find the location using a printed slip or location on a graphical interface.

Next task: After the item is placed in the storage receptacle 108 on the cart 102, the cart 102 can automatically transition to the next task. In one embodiment, the cart 102 either resumes moving forward to another bin location or instructs the associate 104 to transition to another bin or cart 102 in the general area. This automatic transition reduces the time between tasks and improves utilization.

In the example presented in FIG. 8, a 33% reduction in cycle time, corresponding to a 50% increase in productivity, is realized.

The terms and expressions employed herein are used as terms and expressions of description and not of limitation and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The structural features and functions of the various embodiments may be arranged in various combinations and permutations, and all are considered to be within the scope of the disclosed invention. Unless otherwise necessitated, recited steps in the various methods may be performed in any order and certain steps may be performed substantially simultaneously. Accordingly, the described embodiments are to be considered in all respects as only illustrative and not restrictive. Furthermore, the configurations described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. An automation system adapted to improve operating productivity within an area where products are stored, the system comprising:
   a plurality of carts for transporting products within the area; and
   a controller adapted to associate a first one of the plurality of carts with a first person and to control and automatically move the first cart at a controller determined speed to lead the first person around the area.

2. The system of claim 1, wherein the controller determined speed is selected from the group consisting of a speed equal to a normal pace of the first person and a speed faster than a normal pace of the first person.

3. The system of claim 1, wherein the controller is further adapted to set settings of the first cart personal to the first person and to set settings of the first cart personal to a second person different from the first person when the second person is associated with the first cart.

4. The system of claim 1, wherein the controller is further adapted to assign a task to the first person based upon an ability of the first person.

5. The system of claim 1, wherein the controller is further adapted to associate a second one of the plurality of carts with the first person at the same time that the first cart is associated with the first person.

6. The system of claim 1, wherein the controller is further adapted to associate the first cart with a second person different from the first person at the same time that the first cart is associated with the first person.

7. The system of claim 1, wherein the first cart comprises at least one receptacle for receiving a product.

8. The system of claim 1, wherein the first cart comprises a motor for propelling the first cart.

9. The system of claim 1, wherein the first cart comprises at least one of an on-screen interface and an off-screen interface for communicating information to the first person.

10. The system of claim 9, wherein the first cart comprises the on-screen interface and further wherein the on-screen interface is adapted to communicate information concerning at least one of a physical location of the first cart within the area, a physical location of certain product within the area, a current task assigned to the first person, time between various tasks, priorities in the area, and performance of the first person.

11. The system of claim 9, wherein the first cart comprises the off-screen interface and further wherein the off-screen interface comprises at least one of lighting and an audio source.

12. The system of claim 11, wherein the first cart comprises the lighting and further wherein the lighting is adapted to identify a receptacle on the first cart within which a product is to be placed or from which a product is to be retrieved.

13. The system of claim 11, wherein the first cart comprises the lighting and further wherein the lighting is adapted to differ depending upon a task assigned to the first person.

14. The system of claim 11, wherein the first cart comprises the lighting and further wherein the lighting is adapted to communicate information concerning at least one of a status of the first cart, a health of the first cart, a movement speed of the first cart, and a change in direction of the first cart.

15. The system of claim 11, wherein the first cart comprises the audio source and further wherein the audio source is adapted to communicate information concerning at least one of a status of a task assigned to the first person, a proximity of the first cart to a plurality of persons, and a status of the first cart.

16. The system of claim 1, wherein the first cart comprises a sensor for, at least in part, at least one of identifying a distance of the first person from the first cart, determining a position of the first cart within the area, and identifying an obstacle in a path of the first cart.

17. The system of claim 1 further comprising at least one workstation for processing the products.

18. The system of claim 1 further comprising a display for displaying real-time performance metrics of the first and other persons.

19. The system of claim 1 further comprising a plurality of overhead cameras adapted to (i) monitor the plurality of carts, the first person, and material handling equipment, and (ii) determine a location of each cart.

20. The system of claim 1, wherein the area comprises a warehouse.

21. A method for automating and improving operating productivity within an area where products are stored, the method comprising the steps of:
associating a first person with a first one of a plurality of carts for transporting products within the area;
determining, with a controller, a speed at which to move the first cart; and
controlling and automatically moving the first cart at the controller determined speed to lead the first person around the area.

22. The method of claim 21, wherein the controller determined speed is selected from the group consisting of a speed equal to a normal pace of the first person and a speed faster than a normal pace of the first person.

23. The method of claim 21 further comprising associating the first person with a second one of the plurality of carts at the same time that the first person is associated with the first cart.

24. The method of claim 21 further comprising associating a second person different from the first person with the first cart at the same time that the first person is associated with the first cart.

25. The method of claim 21 further comprising assigning a task to the first person based upon an ability of the first person.

26. The method of claim 21 further comprising illuminating a receptacle on the first cart to identify the receptacle within which a product is to be placed or from which a product is to be retrieved.

27. The method of claim 21 further comprising illuminating a receptacle on the first cart differently depending upon a task assigned to the first person.

28. The method of claim 21, further comprising communicating, via an audio source, information concerning at least one of a status of a task assigned to the first person, a proximity of the first cart to a plurality of persons, and a status of the first cart.

29. The method of claim 21, further comprising displaying real-time performance metrics of the first and other persons.

30. The method of claim 21, wherein the area comprises a warehouse.

* * * * *